(12) United States Patent
Ochiai et al.

(10) Patent No.: US 6,488,107 B1
(45) Date of Patent: Dec. 3, 2002

(54) CONTROL DEVICE FOR A HYBRID VEHICLE

(75) Inventors: Shinobu Ochiai, Wako (JP); Kazuhiro Hara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/643,708

(22) Filed: Aug. 23, 2000

(30) Foreign Application Priority Data

Aug. 25, 1999 (JP) .......................................... 11-238948

(51) Int. Cl.⁷ ................................................ B60K 6/00
(52) U.S. Cl. ..................................... 180/65.2; 701/22
(58) Field of Search ............................. 180/65.1, 65.2, 180/65.3, 65.4; 290/40 A, 40 B, 40 C

(56) References Cited

U.S. PATENT DOCUMENTS

| | | | | |
|---|---|---|---|---|
| 5,495,906 A | * | 3/1996 | Furutani | 180/65.2 |
| 5,786,640 A | * | 7/1998 | Sakai et al. | 180/65.2 |
| 5,789,881 A | * | 8/1998 | Egami et al. | 180/64.4 |
| 5,905,360 A | * | 5/1999 | Ukita | |
| 5,993,351 A | * | 11/1999 | Deguchi et al. | 477/5 |
| 5,994,789 A | * | 11/1999 | Ochiai | 180/65.3 |
| 6,007,443 A | * | 12/1999 | Onimaru et al. | 180/65.2 |
| 6,053,842 A | * | 4/2000 | Kitada et al. | 180/65.4 |
| 6,083,139 A | * | 7/2000 | Deguchi et al. | 180/65.2 |
| 6,253,866 B1 | * | 7/2001 | Kojima | 180/65.2 |
| 6,329,772 B1 | * | 12/2001 | Ochiai et al. | 180/65.3 |
| 6,384,552 B2 | * | 5/2002 | Shimane et al. | 318/139 |

* cited by examiner

*Primary Examiner*—Brian L. Johnson
*Assistant Examiner*—Christopher Bottorff
(74) *Attorney, Agent, or Firm*—Arent Fox Kintner Plotkin & Kahn PLLC

(57) ABSTRACT

A control device for a hybrid vehicle that can avoid component damage due to such operation, and can continue driving smoothly even in the case that operation that does not occur during normal driving occurs. In the case that the main contactor 11, which has been turned ON, is turned OFF due to the ignition being turned OFF while the motor 2 has a high rotation speed, and then the ignition is turned ON again, the engine control device 4 controls engine 1 so that the rotation speed of the engine 1 becomes the rotation speed at which the voltage generated by regeneration of motor 2 is equal to or below the withstanding voltage of the power drive unit 7. Subsequently, when the main contactor 11 is turned ON by the engine speed falling, the engine control device 4 controls the engine so that the engine speed becomes equal to or less than 7000 rpm.

2 Claims, 4 Drawing Sheets

CONTROL DEVICE FOR A HYBRID VEHICLE

BACKGROUND OF THE INVENTION

1. Field of the Invention

The present invention relates to a control apparatus for a parallel hybrid vehicle, and in particular, to a control apparatus for a parallel hybrid vehicle that carries out limiting control of the engine speed according to conditions.

2. Description of the Related Art

Recently, the development of electric vehicles has been progressing with the aim of reducing exhaust gas emissions into the atmosphere. However, in the electric vehicle that is being driven as an automobile using only an electric motor actuated by electric energy, the cruising distance is limited by the charge of the battery that stores the electric energy. Contrariwise, if a sufficient cruising distance is to be attained, a huge number of batteries is necessary, and the driving performance of the automobile noticeably deteriorates.

Thus, by using in parallel a combustion engine with the above motor, the size of the battery, which is the power source of the motor, can be reduced, and the development of hybrid vehicles having both cruising distance and driving performance can be developed.

A parallel hybrid vehicle, which is one type of hybrid vehicle, decreases exhaust gas emissions and improves fuel consumption while maintaining the driving performance by carrying out driving by using in parallel one drive from an electric motor and another drive from a combustion engine depending on the driving conditions.

That is, in a parallel hybrid vehicle, the motor is controlled so that the engine is driven only in its range of high efficiency, for example, providing assistance to the engine, etc., during departure and acceleration, thus improving fuel consumption.

In addition, while breaking the vehicle, the motor operates as an electrical generator, and by charging the battery by converting the kinetic energy of a drive wheel to electrical output, fuel consumption is further improved.

However, the motor and the battery are connected through a contactor, and this contactor is ON/OFF controlled by being linked with the ignition switch. That is, during non-driving time, when the ignition is OFF, the contactor is OFF.

In addition, the counter-electromotive force (regenerative voltage) is proportional to the speed of the motor (engine), and is controlled so that even if the motor rotation speed moves into the high range, the counter-electromotive force is controlled so as not to exceed the voltage of the battery (weak magnetic field control). This decreases the apparent torque constant of the motor and decreases the counter-electromotive force by outputting a specified switching waveform.

However, when the ignition is turned OFF during traveling when the motor (engine) is in the high rotation range, the contactor, which is linked thereto, turns ON. When this type of operation occurs, because the above-described weak magnetic field control cannot be generated, the counter-electromotive force of the motor increases and exceeds the withstanding voltage of the inverter. There is the concern that withstanding voltage failure of the inverter will occur as a result of this type of counter-electromotive force produced by the motor being applied only to the inverter because the contactor is in an OFF state.

SUMMARY OF THE INVENTION

In consideration of the above-described problem, it is an object of the present invention to provide a control device for a hybrid vehicle, which is, even when an operation occurs that does not occur in normal driving, capable of avoiding component failure due to this type of operation, and capable of continuing smooth driving.

In order to achieve the above-described object, according to a first aspect of the present invention, a control device for a hybrid vehicle provides a combustion engine 1 that outputs propulsive force to the vehicle, an electric motor 2 that supplements the output of the engine, a storage device (the battery in the embodiment) that is charged by the electricity generated by the regeneration of the motor, a contactor (the precharge contactor 10 and the main contactor 11 in the embodiments) that connects the motor and the storage device, and an inverter (the power drive unit 7 in the embodiments) provided between the motor and the contactor, wherein, in the case that the ignition is turned ON again after the contactor has been turned OFF due to turning OFF the ignition while the rotation of the motor is high, the rotation speed of the engine is limited to the rotation speed (an engine rotation speed $\leq 5500$ rpm in the embodiments) where the voltage generated by the regeneration of the motor is equal to or less than the withstanding voltage of the inverter.

In this manner, the engine speed is limited, and by limiting the voltage generated by the regeneration of the motor so as to be equal to or less than the withstanding voltage of the inverter, the inverter (power drive unit 7 in the embodiments) can be protected.

In addition, according to a second aspect of the present invention, the control device of the hybrid vehicle turns the contactor ON and subsequently releases the limitation on the rotation speed of the engine when the voltage difference between the voltage generated by the regeneration of the motor and the voltage of the storage device is within specified values (an engine rotation speed $\leq 3300$ rpm in the embodiments).

In the case that the voltage difference between the voltage generated by regeneration of the motor and the voltage of the storage device is within specified values, control that turns ON the contactor that is in the OFF state is carried out. In addition, when the contactor is turned ON and a normal state is restored, the limit on the engine speed is released, and the upper limit of the engine speed is set to the rotation speed (7,000 rpm in the embodiments) used during normal driving.

Thereby, normal driving using the motor and engine in parallel can be restored.

DETAILED DESCRIPTION OF THE INVENTION

Figure 1:
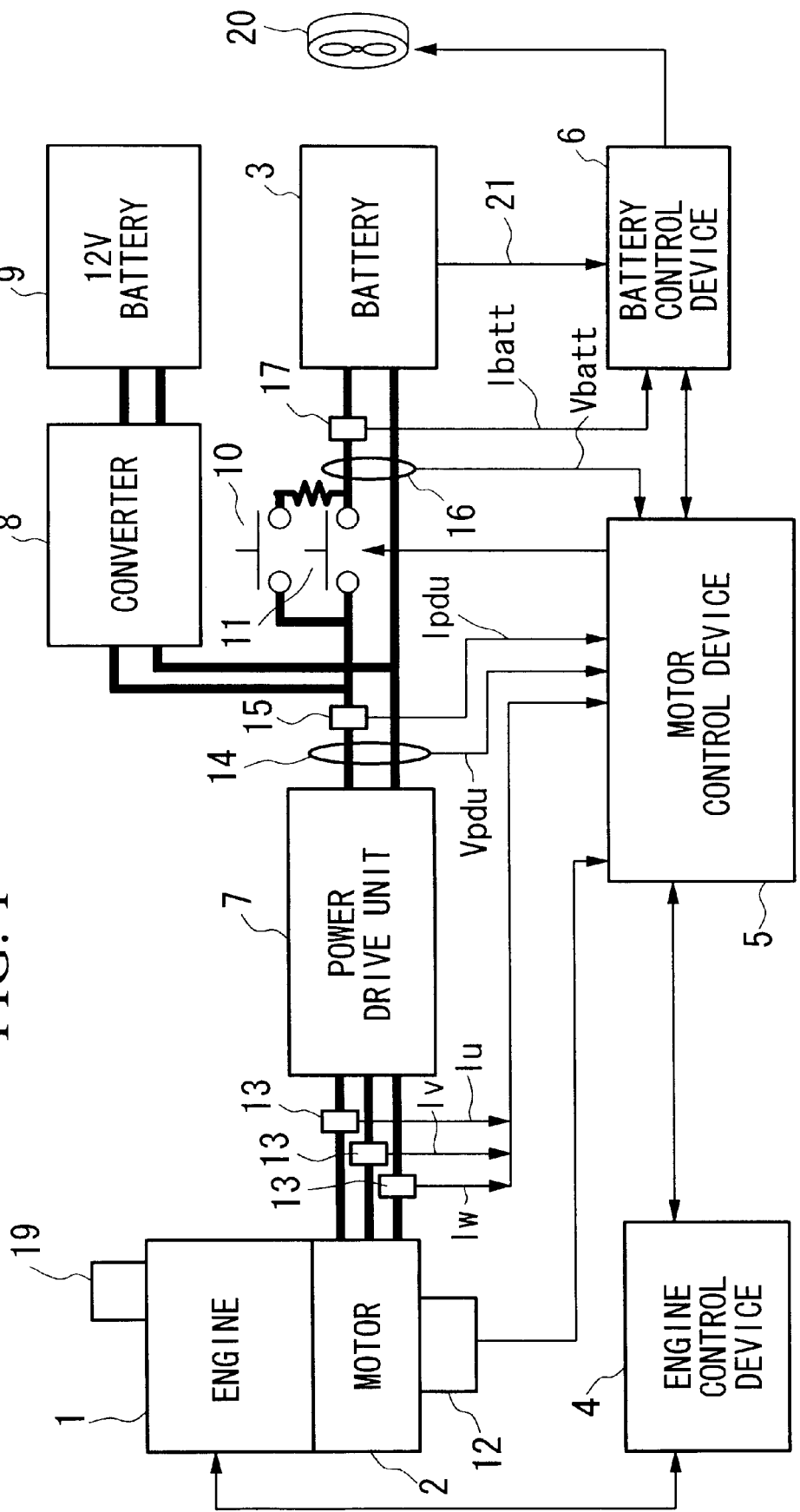
FIG. 1 is a block diagram showing the entire structure of a parallel hybrid vehicle, which is one type of hybrid vehicle, according to the embodiment of the present invention.

Below, the control device for a hybrid vehicle according to the embodiment of the present invention will be explained referring to the drawings.

FIG. 1 is a block diagram showing the entire structure of a parallel hybrid vehicle, which is one type of hybrid vehicle, according to the embodiment of the present invention. In this figure, reference numeral 1 is a combustion engine that operates with the combustion energy of fuel, and reference numeral 2 is an electric motor that is used in parallel with the engine and operates by electric energy. The drive power of both the engine 1 and the motor 2 is transmitted to the drive wheels (not illustrated) via the transmission (not illustrated), comprising an automatic transmission or a manual transmission.

In addition, during deceleration of the hybrid vehicle, the drive energy is transmitted from the drive wheels to the motor 2, and the motor 2 functions as a power generator. The motor 2 captures the kinetic energy of the vehicle body as electrical energy, and the battery is charged, as explained below. Moreover, the drive motor 2 can be structured to provide the electrical generator for charging the battery 3 separately.

Here, the battery 3 has, for example, a plurality of modules connected in series, with these modules in turn comprising a plurality of cells connected serially, and serving as a unit, to form a high voltage battery. Reference numeral 19 is a starter motor dedicated to engine start-up.

Reference numeral 4 is an engine control device that monitors the engine speed, velocity of the vehicle, etc., at specified intervals, and determines as a result of motor regeneration, and modes such as assistance and deceleration. In addition, the engine control device 4 simultaneously carries out determination of the assistance/regeneration amount depending on the mode described below, and outputs information related to these modes and the assistance/regeneration amount, for example, to the motor control device 5. When the motor control device 5 receives this information from the engine control device 4, control of the power drive unit 7 and the like that drives and regenerates the motor 2 according to its commands is carried out.

Reference numeral 6 is a battery control device that carries out calculation of the SOC (state of charge; that is, the "remaining battery charge") of the battery 3. In addition, the battery control device 6 carries out control of the fan 20 that is disposed in proximity to the battery 3 so as to maintain the temperature thereof equal to or less than a specified value in order to protect the battery 3.

Moreover, the engine control device 4, the motor control device 5, and the battery control device 6 are formed by a sequencer or a CPU (Central Processing Unit) and memory, and can realize its function by executing a program for realizing the function of a control device.

Reference numeral 7 is a power drive unit that is formed by two switching elements connected serially or three switching elements connected in parallel. A switching element in this power drive unit 7 is turned ON or OFF by the motor control device 5, and supplies the high voltage DC component, supplied to the power drive unit 7 from the battery 3, to the motor 2 via a three-phase three-wire system.

In addition, reference numeral 9 is a 12 V battery for driving various accessories, and connects to the battery 3 via a converter 8. The converter 8 decreases the voltage from the battery 3 and supplies it to the 12 V battery.

Reference numeral 10 is a precharge contactor and reference numeral 11 is a main contactor. The battery 3 and the power drive unit 7 are connected via these contactors. The ON/OFF control of the precharge contactor 10 and the main contactor 11 is carried out by the motor control device 5.

Reference numeral 12 is a sensor that calculates the position and rotation speed of the motor 2, and reference numeral 13 is a current sensor that detects the Iu, Iv, and Iw currents flowing through three-phase three-wire system. The detected values of these sensors 12 and 13 are input into the motor control device 5.

Reference numeral 14 is a voltage sensor that detects the voltage Vpdu of the input part of the power drive unit 7, and reference numeral 15 is a current sensor that detects the current Ipdu input into the power drive unit 7. Reference numeral 16 is a voltage sensor that detects the voltage Vbatt of the battery 3. The voltage values and current values detected by each of these voltage and current sensors (14–16) are input into the motor control device 5.

Reference numeral 17 is a current sensor on the battery 3 side that detects the current Ibatt flowing through battery 3 via the contactor, and the detected current values are input into the battery control device 6.

In this manner, each of the sensors 16 and 17 detect the voltage Vbatt and current Ibatt on the battery 3 side via the contactors 10 and 11, and each sensor 14 and 15 detects the voltage Vpdu and current Ipdu on the side of the power drive unit 7 via the contactors. In addition, the current Ipdu detected by the current sensor 15 becomes the value subtracted from the current component flowing through the converter 8.

Next, the operation of the control device for the hybrid vehicle comprising the above-described structure will be briefly explained.

First, the battery control device 6 calculates the state of charge in the battery 3 by the values of the current Ibatt, voltage Vbatt, etc., and outputs the state of charge to the motor control device 5. The motor control device 5 outputs the received state of charge to the engine control device 4.

Engine control device 4 determines the mode (assistance, regeneration, start-up, deceleration, etc.) and the necessary energy in the motor 2 by the state of charge, the engine speed, the degree of throttle opening, engine torque, the actual torque of the motor, etc, and outputs the mode and required electrical power to the motor control device 5.

When the motor control device 5 receives the mode and required electrical power from the engine control device 4, during assistance or deceleration, feedback is carried out such that the electrical power on the input side of the power drive unit 7 (the side of the voltage sensor 14 and the current sensor 15 in FIG. 1) furnishes the required electrical power received from the engine control device 5, and calculates the torque. At the same time, during cruising, feedback is carried out such that the power value of the battery 3 (the voltage sensor 16 and the current sensor 17 in FIG. 1) furnishes the required electrical power, and calculates the torque. When the torque is calculated in this manner, the motor control device 5 controls the power drive unit 7 according to the calculated torque. In addition, during start-up, the motor control device 5 carries out engine start-up control using the motor 2 by controlling the power drive unit 7.

Next, when motor control device 5 receives the actual torque from the power drive unit 7, it outputs the actual torque to the engine control device 4.

The engine control device 4, the motor control device 5, and the battery control device 6 carry out control of the engine 1, the motor 2, and the battery 3 by carrying out at the above-described specified timing continuous control to drive the hybrid vehicle.

Next, the switching operation of the above-described contactor, that is, the precharge contactor 10 and the main contactor 11, will be explained. During the engine start-up, that is, when the ignition is turned ON, the battery 3 has a normal voltage of about 144 V. In contrast, during the engine start-up, the power drive unit 7 has 0 V.

In this manner, in the case that the potential difference between the two is great, when the main contactor 11 is turned ON, the main contactor 11 melts because a very large current flows from the battery 3 to the power drive unit 7. Thus, in order to prevent melting of the main contactor 11 in this manner, during engine start-up, first the precharge contactor 10 connected through a resistor is turned ON, and the current flowing from the battery 3 to the power drive unit 7 is suppressed. In addition, when the potential difference between the battery 3 and the power drive unit 7 becomes small, the precharge contactor 10 is switched to the main contactor 11.

Actually, the switching of the above-described contactor is entirely carried out by the motor control apparatus 5. During the engine start-up, the motor control device 5 first turns ON the precharge contactor 10. Meantime, the motor control device 5 monitors each of the voltages sent from the voltage sensor 16 installed at the output terminal of the battery 3 and the voltage sensor 14 installed on the input terminal of the power drive unit 7, and at the point that the potential differences are within predetermined values (in the present invention, when the potential difference is equal to or less than 15 V), a signal to switch from the precharge contactor 10 to the main contactor 11 is output.

In this manner, the voltage of the power drive unit 7 is gradually increased by turning on the precharge contactor 10, and after the potential difference between the potentials of the power drive unit 7 and that of the battery 3 falls within specified values, the main contactor 11 to drive the motor 2 is turned ON.

Next, in the hybrid vehicle in which the drive is controlled by the above-described control device, the case will be explained wherein the ignition is turned OFF and then turned ON again when the motor 2 is at a high rotation speed. Moreover, this condition has two cases: when the ignition is turned ON while the vehicle is being towed in a state when the ignition is turned OFF, and when the ignition is turned OFF and then turned ON again while the vehicle is driving at high speed.

When the ignition is turned OFF while the motor 2 has a high rotation speed, the engine control device 4, the motor control device 5, and the battery 6 enter a state in which the electric source from the 12 V battery is not supplied.

Simultaneously, the main contactor 11, which until this point in time has been turned ON, is turned OFF. Thereby, the battery 3 and the power drive unit 7 enter a disconnected state.

In contrast, the drive wheels continue to rotate even when the ignition pulse has become turned OFF. Thereby, the motor 2 regenerates electricity, and electrical power proportional to the regeneration of the motor 2 is generated.

Normally, since the power drive unit 7 and the battery 3 are connected by the main contactor 11, the electrical power produced by the regeneration of the motor 2 is supplied to the battery 3 such that the power drive unit 7 and the battery 3 have substantially identical potentials. However, when the main contactor 11 is turned OFF, and the battery 3 and the power drive unit 7 are in a non-connect ed state, the electrical power generated by the regeneration of the motor 2 is supplied as a load only to the power drive unit 7. As a result, the voltage of the power drive unit 7 is increased in proportion to the rotation speed of the motor 2, and a potential difference with the battery 3 is produced.

For example, in the motor 2 in the present embodiment, 60 V is generated at an engine speed of 1000 rpm. Therefore, if the engine rotation speed is 4000 rpm, with the contactors 10 and 11 in an OFF state, a voltage of (4000/1000) * 60=240 V is applied to the power drive unit 7. In addition, because at this time the battery 3 has a rating of about 144 V, a potential difference of 240−144=96 V is generated between the battery 3 and the power drive unit 7.

Moreover, in this embodiment, the drive axis of the engine 1 and the drive axis of the motor 2 are coaxial, and thus the engine speed can be set equal to the motor speed.

Next, the case will be explained in which the ignition is turned ON again in the state in which the ignition has been turned OFF while the motor is at a high rotation speed. When the ignition is turned ON, in each control device, electricity is supplied from the 12 V battery 9, and the control identical to normal control is commenced.

However, at this time, as described above, because the voltage of the power drive unit 7 is much larger than the voltage of the battery 3, in this state, the main contactor 11 cannot be turned ON. This is because by turning ON the main contactor 11, a large current flows from the power drive unit 7 to the battery 3, and the main contactor 11 melts.

In a state in which the contactor is not turned ON in this manner, that is, a state in which the battery 3 and the power drive unit 7 are in a state of non-contactor, when the regeneration by the motor 2 is continued, a voltage that exceeds the withstanding voltage is applied to the power drive unit 7, and as a result, the power drive unit 7 breaks down or its service life is shortened.

Thus, by limiting the rotation s of the motor and reducing the voltage generated by the regeneration of the motor 2 to equal to or less than the withstanding voltage of the power drive unit 7, the power drive unit need not be protected from failure or shortening of its service life.

This means that by limiting the engine speed, control that reduces the regenerative voltage of the motor is carried out.

Below, the processing carried out by the engine control device 4 and the motor control device 5 is explained referring to the figures for the case in which the ignition is turned OFF and then turned ON again during the high rotation speed of the motor.

Figure 2:
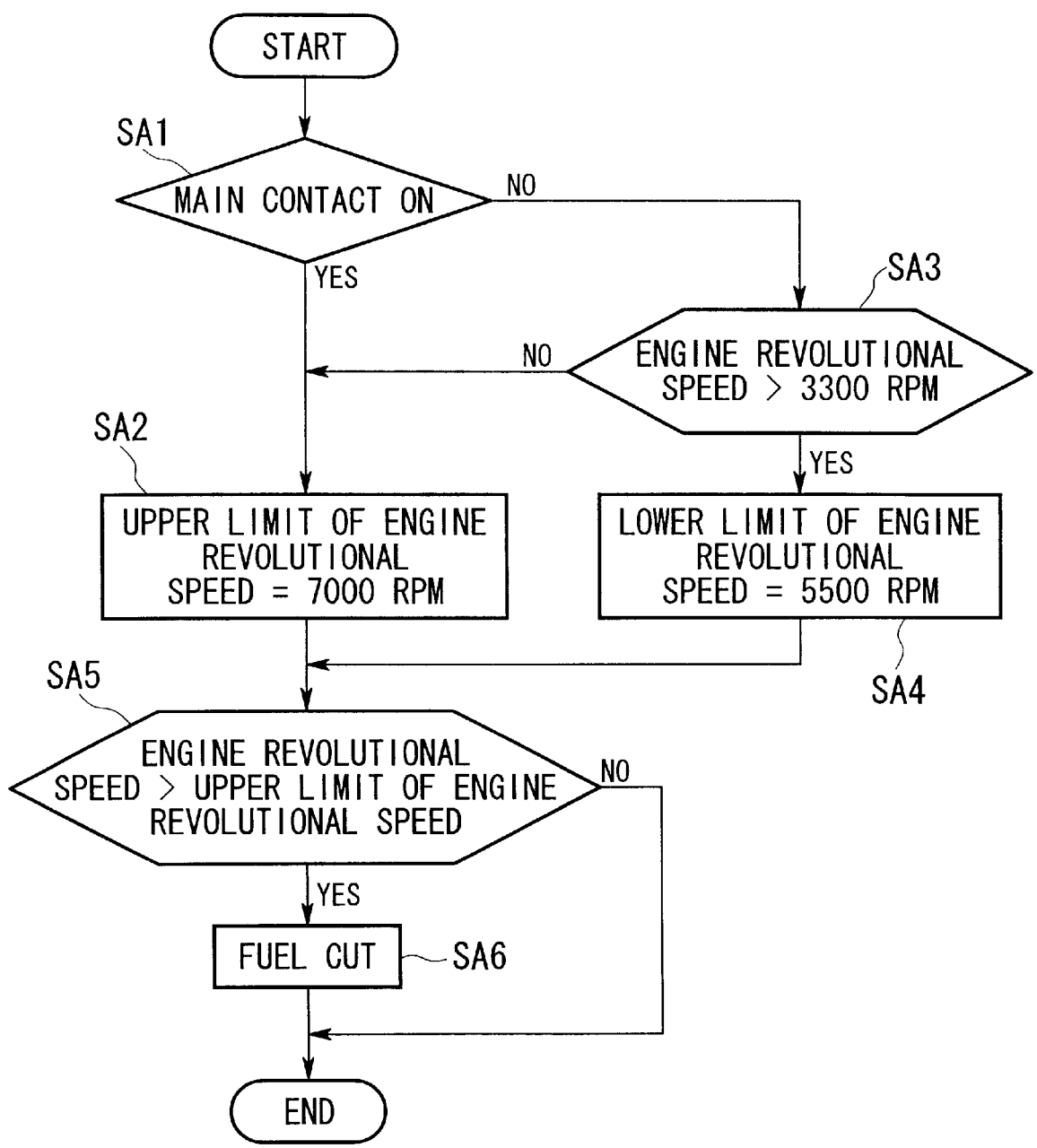
FIG. 2 is a flowchart for explaining the operation of the engine control device 4 according to the same embodiment.

FIG. 2 shows a flowchart of the processing carried out by the engine control device 4. First, in step SA1, it is determined whether or not the main contactor 11 is turned ON. When it is determined the main contactor 11 is turned ON, the flow proceeds to step SA2, and the upper limit of the engine speed is set at 7000 rpm.

In contrast, when the contactor 11 is not ON in step SA1, the flow proceeds to step SA3, wherein it is determined whether or not the current engine speed is equal to or above 3300 rpm. When the engine speed is equal to or above 3300 rpm, the flow proceeds to step SA4, and the upper limit of the engine rotation speed is set to 5500 rpm. In addition, in step SA3, when it is determined that the current engine speed is equal to or less than 3300 rpm, the flow proceeds to step SA2 after main contactor 11 is turned ON by the motor control device 5, described below, and the upper limit of the engine speed is set to 7000 rpm.

When the upper limit of the engine speed is set in step SA2 or step SA4, it is determined in step SA5 whether or not the current engine speed is equal to or less than the above-described upper limit of the engine speed. In addition, when the current engine speed exceeds the upper limit of the engine speed, a fuel-cut, which stops the fuel supply to the engine, is carried out in step SA6, and the engine speed and the motor speed are lowered. Thereby, the voltage generated by the regeneration of the motor 2 is lowered.

In this manner, the engine control apparatus 4 monitors the engine speed at predetermined intervals and carries out control to restrict the engine speed to equal to or less than 7000 rpm in the came that the main contactor 11 is in an ON state, and limits the engine speed to equal to or less than 5500 rpm in the case that the main contactor 11 is turned OFF.

Here, the upper limits of the engine speed that are set here are determined by the following objectives. The engine speed of 7000 rpm is a value set to protect engine 1, and when the vehicle is traveling normally, the upper engine speed is set to this value.

In addition, the engine speed of 5500 rpm is a value set to protect the power drive unit 7. Normally, the motor generates electrical power in proportion to the rotation speed by regeneration, but the motor 2 in the present invention has the capacity to generate 60 V when the engine speed is 1000 rpm, as described above. Therefore, the voltage regenerated at an engine speed of 5500 rpm is (5500/1000) * 60=330 V, and in the present embodiment, the regeneration of the motor 2 is controlled so that a voltage equal to or greater than 330 V is not applied to the power drive unit 7. Moreover, 330 V is the value equal to or less than the withstanding voltage of the power drive unit 7.

Furthermore, when the engine speed has become 3300 rpm (it has decreased), the control of the contactor described below (refer to FIG. 4) determines that the counter-electromotive force of the motor 2 has decreased and that the contactor is turned ON, and thus the upper limit value of the engine speed returns to normal (7000 rpm).

Thus, by limiting the engine speed, the failure or shortening of the service life of the power drive unit 7 due to the voltage generated by the regeneration of the motor 2 can be prevented.

Figure 3:
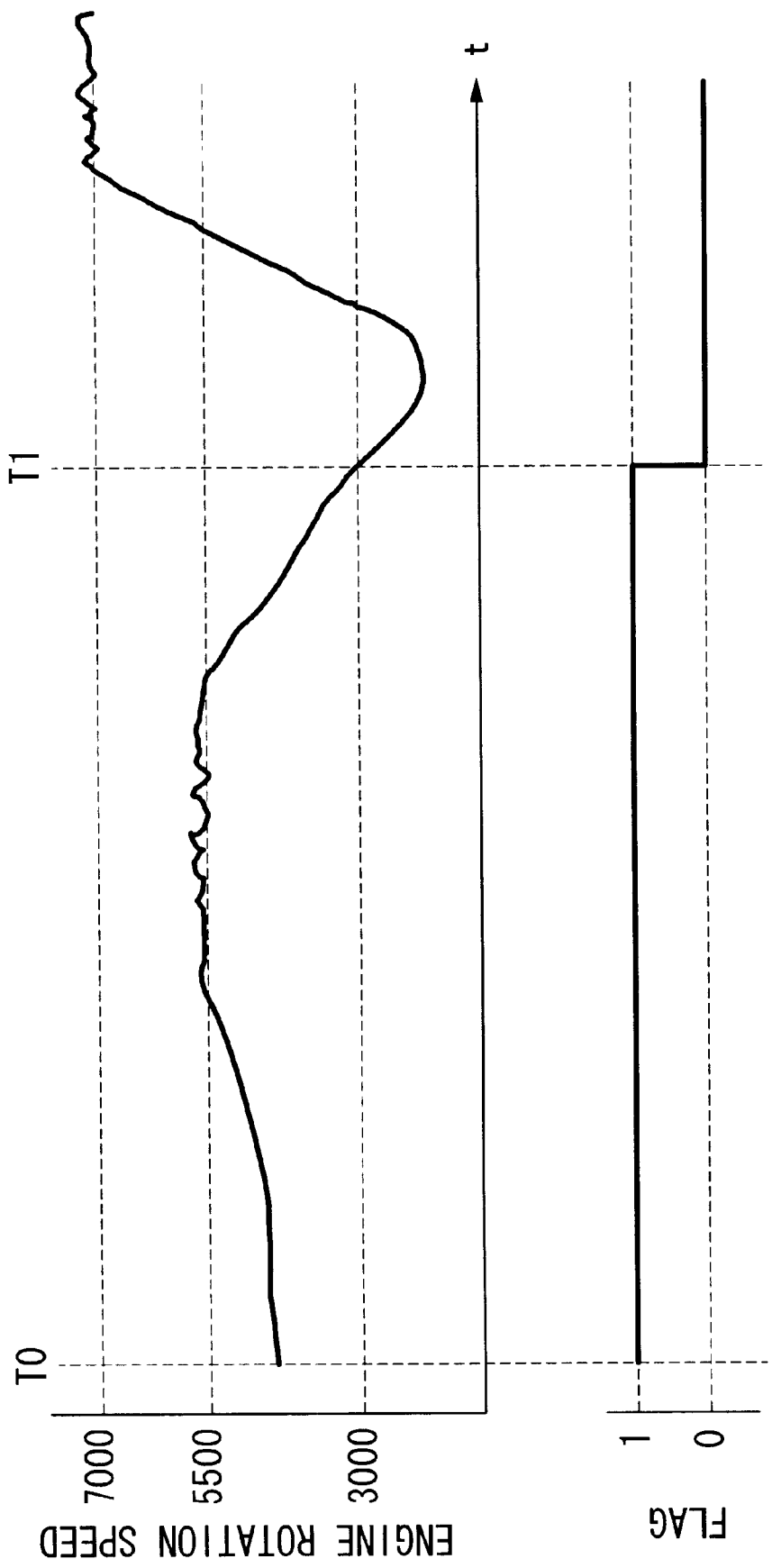
FIG. 3 is a drawing showing the transitions of the engine speed.

Next, FIG. 3 shows the transitions of the engine speed when the engine speed is being limited as described above. In this figure, the ordinate shows the engine speed and the abscissa shows the time. In addition, the flags request a limitation of the engine speed.

At time T0 in FIG. 3, the ignition is assumed to be turned ON. Moreover, at this point in time, contactors 10 and 11 are OFF. In the case that contactor 10 and 11 are turned OFF, as shown by step SA4 in FIG. 2, the upper limit of the engine speed is set to 5500 rpm. Thereby, between times T0–T1, the engine speed is limited to 5500 rpm or less.

Furthermore, when the engine speed has become equal to or less than 3300 rpm, the contactor is turned ON by the motor control device 5 (refer to the flowchart in FIG. 4, described below), and when it has determined that the motor system has returned to a normal state, the upper limit of the engine speed is set to 7000 rpm for normal driving. Thereby, the engine speed after T1 shifts as shown in FIG. 3.

Moreover, at time T0–T1, the flag shown at the bottom part cannot turn ON the contactors 10 and 11 because the engine speed is high, and thus shows "1", and thereby requests control to restrict the engine speed. In addition, during driving, at time T1, when the engine speed is lowered to a rotation speed (engine speed=3300 rpm) at which the contactors 10 and 11 can be turned ON, and when the main contactor 11 is turned ON by the motor control device 5, the flag shows 0, and thereafter, until the main contactor 11 is again turned OFF, the flag shows "0".

Figure 4:
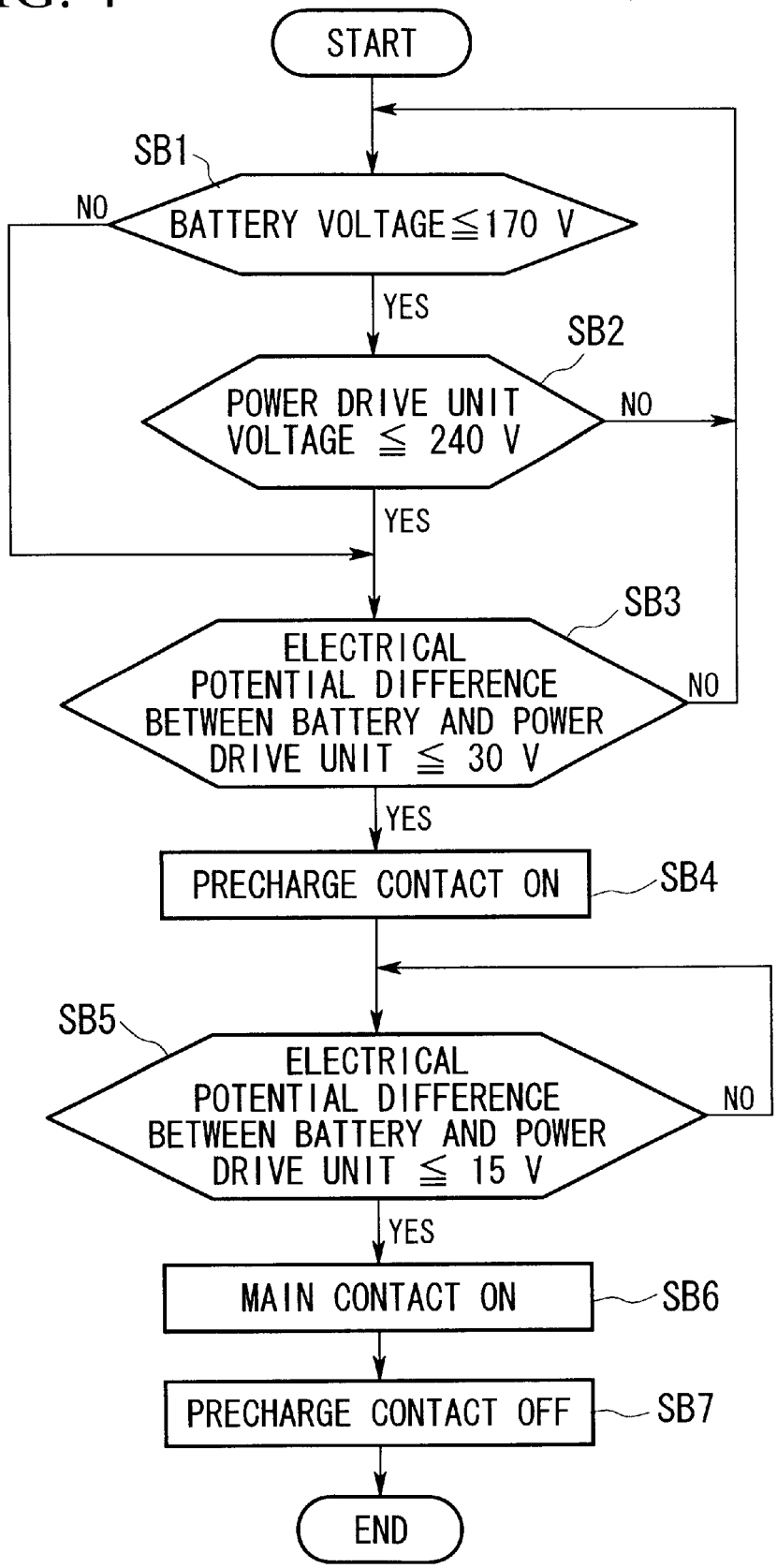
FIG. 4 is a flowchart for explaining the operation of the motor control device 5 in the same embodiment.

FIG. 4 is a flowchart of the ON/OFF control of the contactors (precharge contactor 10, main contactor 11). This control is linked with the ignition switch and is executed by the motor control device 5.

First, in step SB1, the motor control device 5 determines whether or not the voltage of the battery 3, that is, the voltage sent from the voltage sensor 16, is equal to or less than 170 V, and in the case that this voltage is greater than 170 V, the flow proceeds to step SB3.

In contrast, in the case that the voltage of battery 3 is equal to or less than 170 V, the flow proceeds to step SB2, which determines whether or not the voltage of the power drive unit 7, that is, the voltage sent from the voltage sensor 14, is equal to or less than 240 V, and if this voltage is equal to or less than 240 V, the flow proceeds to step SB3.

In Step SB3, it is determined whether or not the potential difference between the battery 3 and the power drive unit 7 is within 30 V. This means that it is determined whether or not the difference in voltage sent from the voltage sensor 14 and 16 is equal to or less than 30 V.

In addition, in the case that the potential difference between the battery 3 and the power drive unit 7 is equal to or less than 30 V, the flow proceeds to step SB4, wherein the precharge contactor 10 is turned ON.

This means that in the above-described processing, when the voltage of battery 3 is equal to or less than 170 V with respect to the rated voltage of 144 V, that is, when the voltage of battery 3 is close to the rated voltage for the normal operation or when the electric discharge progresses and the voltage drops, and if the voltage of the power drive unit 7 is equal to or less than 240 V, and the voltage difference with the power drive unit 7 is equal to or less than a specified value (30 V), the motor control drive 5 carries out control to turn ON the precharge contactor 10.

In addition, during a normal engine start-up, the voltage of the precharge contactor 7 is 0 V, and the battery voltage is substantially the rated voltage. Thus, when the ignition switch is turned ON, the precharge contactor 10 is immediately turned ON. In contrast, when the motor speed is high, voltage of the power drive unit 7 also rises, and thus the precharge contactor 10 is not turned ON until the voltage falls.

In contrast, when the voltage of the battery 3 is equal to or above 170 V with respect to the rating of 144 V, that is, the voltage of battery 3 temporarily rises by over-regeneration, the motor control device 5 carries out control to turn ON the precharge contactor 10, irrespective of the voltage of the power drive unit 7, if the voltage difference between the battery 3 and the power drive unit 7 is below a specified value (30 V). In this case, even if the motor speed is high and the voltage of the power drive unit 7 rises, there is no problem even if the precharge contactor 10 is turned ON because the battery voltage also rises if the potential difference decreases,.

Next, when the precharge contactor 10 is turned ON in step SB4, the flow proceeds to step SB5. In Step SB5, it is determined whether or not the potential difference between the battery 3 and the power drive unit 7 is equal to or less than, for example, 15 V. In the case that the potential difference is equal to or less than 15 V, the flow proceeds to step SB6, the main contactor 11 is turned ON, and subsequently, in step SB7, the precharge contactor 10 is turned OFF.

Thereby, as a result of turning ON the precharge contactor 10, the voltage difference between the power drive unit 7 and the battery 3 is sufficiently reduced, and when the difference has fallen to 15 V or less, the motor control drive 5 carries out control to turn ON the main contactor 11.

Moreover, the above-mentioned voltage values (for example, 30 V and 15 V) are only examples, and any voltage values may be adopted as long as the voltage difference between power drive unit 7 and battery 3 is sufficiently reduced and the voltage value does not cause damage even when the contactor is ON.

Moreover, in the above-described step SB2, in the case that the voltage of the power drive unit 7 is equal to or greater than 240 V, or in step SB3, in the case that the potential difference between the battery 3 and the power drive unit 7 is equal to or greater than 30 V, because the precharge contactor 10 cannot be turned ON, the flow returns to step SB1 until the conditions are such that the precharge contactor 10 is turned ON, and the above-described processing is repeated.

In addition, in step SB6, in the case that the potential difference between the battery 3 and the power drive unit 7 is equal to or greater than 15 V, this processing is repeated at a specified interval until the potential difference is equal to or less than 15 V.

As described above, the voltage of the power drive unit 7 and the battery 3 is monitored, and when both potentials have become substantially equal, by turning ON the precharge contactor 10, the flow of a large current can be prevented, and thus melting of the precharge contactor 10 can be prevented.

Moreover, the motor control device 5 sometimes has a self holding function. This self holding function is a function wherein normal operation can be held until the engine speed becomes equal to or less than 300 rpm even in the case that the ignition is in an OFF state. In a motor control device 5 having this type of self holding function, when the engine is at a high rotation speed, after the ignition is turned OFF, the gear is set in neutral, and the engine speed falls to 300 rpm or less, and thus, subsequently, in the case that the ignition is turned ON again, the above-described processing is carried out.

In this manner, it is possible to avoid the contactors to be turned OFF by providing the motor control device 5 a self holding function, even when the ignition is turned OFF during high speed driving, which enables normal driving. In addition, even in the case that the ignition is turned OFF during high speed driving, the gear shifts to neutral, and the contactor turned OFF, by carrying out control to limit the engine speed as described above, and limiting the voltage generated by regeneration of motor 2 to equal to or below the withstanding voltage of the power drive unit 7, failure or shortening of the service life of the power drive unit 7 can be prevented.

In the above-explained manner, by the control device of the hybrid vehicle according to the present invention, after the contactor is turned OFF due to turning OFF the ignition when the motor is at a high rotation speed, in the case that the ignition is turned ON again, the engine speed is limited to the rotation speed at which the voltage generated by the regeneration of the motor is equal to or less than the withstanding voltage of the inverter.

Thereby, after the contactor is turned OFF by the ignition being turned OFF while the motor is at a high rotation speed, in the case that the ignition is turned ON again, the engine speed is limited, and by restricting the generation of electricity by the regeneration of the motor, withstanding voltage failure and shortening of the service life of the inverter can be avoided.

What is claimed is:

1. A control method for a hybrid vehicle, wherein the hybrid vehicle comprises:

an engine that outputs propulsive force to the vehicle;

a motor that assists the output of the engine;

a storage battery device that is charged by the electricity generated by regeneration of said motor;

an ignition switch that is operated by a driver;

a contactor separate from said storage device connecting said motor and said storage device; and an inverter provided between said motor and said contactor, wherein the control method comprises:

turning OFF said ignition switch and turning OFF said contactor;

turning ON said ignition switch, during a high motor rotation speed; and limiting an engine rotation speed to a speed at which the voltage generated by regeneration of said motor is equal to or less than the withstand voltage of said inverter.

2. A control method for a hybrid vehicle according to claim 1, further comprising:

when a voltage difference between the voltage generated by regeneration of said motor and the voltage of said storage battery device is reduced below a predetermined value, turning ON said contactor; and canceling said limiting control of the engine rotation speed.

* * * * *